United States Patent
Chari et al.

(10) Patent No.: US 7,382,424 B2
(45) Date of Patent: Jun. 3, 2008

(54) REFLECTIVE CHIRAL-NEMATIC LIQUID CRYSTAL DISPLAY WITH BROADBAND REFLECTION

(75) Inventors: Krishnan Chari, Fairport, NY (US); Charles M. Rankin, Jr., Penfield, NY (US)

(73) Assignee: Industrial Technology Research Institute, Hsinchu (TW)

( * ) Notice: Subject to any disclaimer, the term of this patent is extended or adjusted under 35 U.S.C. 154(b) by 9 days.

(21) Appl. No.: 10/718,900

(22) Filed: Nov. 21, 2003

(65) Prior Publication Data

US 2005/0110925 A1 May 26, 2005

(51) Int. Cl.
*G02F 1/1333* (2006.01)

(52) U.S. Cl. .................. 349/86; 349/115; 349/175; 349/185

(58) Field of Classification Search .............. 349/74, 349/86, 115, 175, 185
See application file for complete search history.

(56) References Cited

U.S. PATENT DOCUMENTS

| | | | |
|---|---|---|---|
| 5,847,798 A | 12/1998 | Yang et al. | 349/169 |
| 5,875,012 A | 2/1999 | Crawford et al. | 349/74 |
| 6,034,752 A | 3/2000 | Khan et al. | 349/74 |
| 6,061,107 A * | 5/2000 | Yang et al. | 349/86 |
| 6,359,673 B1 | 3/2002 | Stephenson | 349/185 |
| 6,753,044 B2 * | 6/2004 | Faris et al. | 428/1.1 |

FOREIGN PATENT DOCUMENTS

WO 2004/109378 A 12/2004
WO 2004/109382 A 12/2004

OTHER PUBLICATIONS

T. Kakinuma et al., "Black and White Photo-addressable Electronic Paper using Encapsulated Cholesteric Liquid Crystal and Organic Photoconductor," IDW 2002, pp. 1345-1348.

* cited by examiner

*Primary Examiner*—David Nelms
*Assistant Examiner*—Phu Vu
(74) *Attorney, Agent, or Firm*—Akin, Gump, Strauss, Hauer & Feld LLP

(57) ABSTRACT

A display sheet comprising a substrate carrying layers of material; including a polymer-dispersed chiral-nematic liquid-crystal layer having a first high reflection state within the visible light spectrum and a second less-reflective state in said spectrum, said states being changeable by an electric field, which states can be maintained in the absence of an electric field; a first transparent conductor disposed over said polymer-dispersed chiral-nematic liquid-crystal layer; and a second conductor, wherein said imaging layer is substantially a monolayer of said domains comprises a mixture of at least two differently reflecting liquid crystal materials, in which the λ maximums of the two materials are separated by 100 to 250 nm.

18 Claims, 4 Drawing Sheets

REFLECTIVE CHIRAL-NEMATIC LIQUID CRYSTAL DISPLAY WITH BROADBAND REFLECTION

FIELD OF THE INVENTION

The present invention relates to a display sheet having a chiral-nematic liquid-crystal layer that can change states, a relatively lighter (brighter) state and a relatively darker state, to provide a viewable image. In particular, the invention relates to a display sheet in which the relatively lighter state exhibits a more neutral appearance based on a broadband reflection.

BACKGROUND OF THE INVENTION

Bi-stable reflective displays based on PDLC are known. A polymer dispersed liquid crystal (PDLC) system contains droplets of liquid crystal material dispersed in a polymer matrix. Such systems are known in the art and have been disclosed by Doane et al. (Applied Physics Letters 48, 269 (1986)), West et al. (Applied Physics Letters 63, 1471 (1993)) and by Stephenson (U.S. Pat. No. 6,359,673). The PDLC may be used to create passive matrix displays on flexible substrates. See also U.S. Pat. No. 6,061,107 to Yang et al., incorporated by reference. Chiral-nematic liquid-crystals, also referred to as cholesteric liquid crystals, have the capacity of maintaining (in a stable state) one of a plurality of given states in the absence of an electric field.

U.S. Pat. No. 5,251,048 to Doane et al. and West et al. disclose a PDLC based bi-stable reflective display. The device comprises droplets of chiral nematic liquid crystal (CLC) in a polymer binder coated between two transparent electrodes. The CLC material can be switched between a reflecting planar state and a weakly scattering focal conic state by application of voltage pulses of different magnitudes. The planar and focal conic states are both stable at zero applied field. West et al. note a change in shape of the reflection spectrum of the CLC material when it is confined to the geometry of a dispersed droplet. They note that the reflectivity changes much less with observation angle compared to the original chiral nematic mixture. However, they disclose the spectrum of only a single CLC material with peak reflectivity of 564 nm and do not teach methods for obtaining a broadband reflecting display having a more neutral appearance. Furthermore, although they note that the domain structure of the dispersed system in the focal conic state scatters light uniformly over the visible portion of the spectrum with the back scattered intensity gradually increasing at lower wavelengths, they do not specifically teach methods to improve contrast of the display.

Stephenson in U.S. Pat. No. 6,359,673 discloses a PDLC based bi-stable reflective display. A neutral appearance in the reflective state is obtained by combining the reflections of droplets of CLC material doped to give reflections either in the blue, green and red part of the spectrum or the blue and yellow part of the spectrum. Stephenson does mention that the polymer-dispersed liquid crystals have good off-axis reflectivity but does not teach how this property is to be used to create more neutral looking displays with improved viewing angle dependence. Stephenson teaches that domains or droplets of liquid crystal in the light-modulating layer are smaller than the thickness of the layer so that multiple domains overlap. Stephenson further teaches that the contrast of the display may be improved by combining multiple overlapping domains comprising right handed and left handed chiral-nematics. However, Stephenson does not mention anything about the effect of this on the back-scattered intensity in the focal conic state.

T. Kakinuma et al., in "Black and White Photo-addressable Electronic Paper using Encapsulated Cholesteric Liquid Crystal and Organic Photoconductor," *IDW* '02, page 1345 to 1348 discloses a liquid crystal display using red (pink) and green capsules to create broadband. However, Applicants have determined that using an imaging layer having substantially more than a monolayer of domains (as shown by the enlarged portion of FIG. 1 results in relatively low contrast ratios.

U.S. Pat. No. 5,875,012 A to Yang et al. discloses a broadband reflective display having improved reflectivity as well as a lack of haze or opaqueness when viewed from various viewing angles, a reduced drive voltage compared to conventional devices, and an improved peak photopic reflectance. The broadband reflective display includes a plurality of pairs of substrates, a plurality of groups of alternating liquid crystal and polymer layers formed between each of the pairs of substrates, each of the groups of liquid crystal and polymer layers being reflective of different wavelengths of light.

U.S. Pat. No. 5,847,798 discloses (particularly in FIG. 7) a liquid crystal cell having multiple stable reflecting states between a colored reflecting state and a light scattering state in order to allow for a substantially white background. Under room light conditions, where light is incident on the cell from all directions, the light reflected from different domains has different colors because the incident angles θ in different domains are different. As such, the light observed by a human eye is an average of the reflection bands centered at different wavelengths and has a substantially white appearance.

U.S. Pat. No. 6,034,752 to Khan discloses a liquid crystal device in which the liquid crystal material has a pitch length effective to reflect radiation having both the visible and the infrared ranges of the spectrum, either in a single region (single cell) between opposing substrates or in separate regions, for example, in stacked regions in which a first cell reflects red light and a second cell reflects blue light and a third cell reflects green light. Example 2 discloses a composition for a single cell display that reflects both visible and infrared radiation. The Examples do not employ domains of liquid crystal in a polymer matrix and the imaging layers are not coated on a flexible substrate.

Chiral-nematic liquid crystals reflect a portion of the visible spectrum when in a reflective state. It is preferable that the reflective state has neutral color balance. It would be useful to provide chiral-nematic displays exhibiting neutral density in the reflective state. It would be useful for such displays to be fabricated using simple, low-cost processes.

SUMMARY OF THE INVENTION

It is an object of this invention to provide displays that generate a light reflection that provides substantially improved neutral color when the liquid crystal in such displays are in the bright state, particularly compared to a display having a single liquid-crystal composition tuned to a single peak reflectance.

It is a further object of the invention to provide an improved angle dependence when viewing a polymer-dispersed liquid-crystal imaging layer.

It is a further object of the invention to provide a broader reflection range at high contrast in the visible part of the spectrum.

These objects are achieved in a display sheet comprising:
 a) an optional substrate for carrying layers of material;
 b) an imaging layer comprising a substantial monolayer of isolated domains of liquid-crystal material dispersed in a continuous matrix, said liquid-crystal material having a first reflecting state within the visible light spectrum defining an operating spectrum and a second weakly scattering state in said operating spectrum, wherein said states are capable of being interchanged by an electric field, which states are capable of being maintained as a stable state in an absence of an electric field, wherein said domains of liquid-crystal material comprises a mixture of at least two populations, a first population comprising a first liquid-crystal material have a first $\lambda_{max}$ and a second liquid-crystal material having a second $\lambda_{max}$, wherein there is a difference between said first and said second $\lambda_{max}$ is at least 50 nm, preferably at least 100 nm;
 c) a first transparent conductor disposed on one side of the imaging layer; and
 d) a second electrode.

In one embodiment, the imaging layer comprises a mixture of two types of domains each reflecting in a different part of the visible spectrum, wherein the λ maximums of the two materials are separated by 100 to 250 nm. The present invention provides a more color-neutral image area when the image area is in the bright (for example, planar) state.

DETAILED DESCRIPTION OF THE PREFERRED EMBODIMENT

Figure 1:
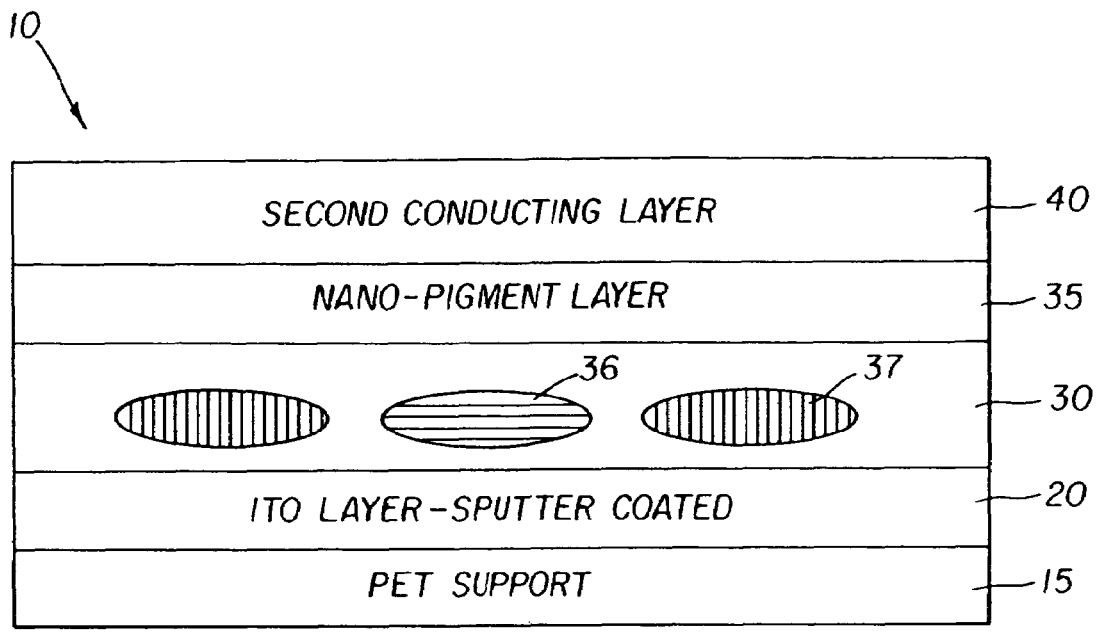
FIG. 1 is a diagram of a display device in accordance with the present invention in which a substantial monolayer of domains in an imaging layer comprises a mixture of two populations of domains comprising, respectively, two differently reflecting liquid-crystal materials.

The present displays contain chiral-nematic (also referred to as "cholesteric") liquid crystal (CLC) materials. A chiral-nematic liquid-crystal (CLC) material showing Bragg reflection in the visible part of the spectrum is composed of either chiral molecules or, more commonly, a nematic host with a high-twist chiral dopant. The helical twisting power (HTP) of a chiral dopant is a measure of the ability of a chiral dopant to re-organize the directors in a nematic host to achieve Bragg reflection in the visible part of the spectrum. The wavelength of Bragg reflection is dependent on the induced pitch. The latter is inversely proportional to the concentration of chiral dopant.

$$1/p = HTP \times C$$

In the above expression, p is the pitch of the chiral nematic material and C is the concentration of chiral dopant. High twist chiral dopants may be characterized as dopants having HTP values in excess of 100 $(\mu m)^{-1}$ when C is expressed in mole fraction units.

The present invention employs, as a light-modulating layer, chiral-nematic liquid-crystal compositions dispersed in a continuous matrix. Such materials are referred to as "polymer-dispersed liquid crystal" materials or "PDLC" materials. Such materials can be made by a variety of methods. For example, Doane et al. (Applied Physics Letters 48, 269 (1986)) disclose a PDLC comprising approximately 0.4 µm droplets of nematic liquid crystal 5CB in a polymer binder. A phase separation method is used for preparing the PDLC. A solution containing monomer and liquid crystal is filled in a display cell and the material is then polymerized. Upon polymerization the liquid crystal becomes immiscible and nucleates to form droplets. West et al. (Applied Physics Letters 63, 1471 (1993)) disclose a PDLC comprising a chiral nematic mixture in a polymer binder. Once again a phase separation method is used for preparing the PDLC. The liquid-crystal material and polymer (a hydroxy functionalized polymethylmethacrylate) along with a cross-linker for the polymer are dissolved in a common organic solvent toluene and coated on an indium tin oxide (ITO) substrate. A dispersion of the liquid-crystal material in the polymer binder is formed upon evaporation of toluene at high temperature. The phase separation methods of Doane et al. and West et al. require the use of organic solvents that may be objectionable in certain manufacturing environments.

A preferred method of making polymer-dispersed liquid-crystal materials involves emulsions of chiral-nematic materials in aqueous polymer media such as aqueous solutions of polyvinyl alcohol (PVA) or gelatin. Uniform dispersions of liquid-crystal materials may be prepared in these media and coated on suitable substrates. The water is then evaporated and the polymer cross-linked to create a light-modulating layer of an electro-optic device. The use of objectionable organic solvents is thereby eliminated. Such methods are disclosed in commonly assigned, copending U.S. patent application Ser. No. 10/095,379 to Stephenson, filed Mar. 12, 2002, titled "A Method Of Making A Coated Polymer-Dispersed Electro-Optical Fluid And Sheets Formed Thereby, hereby incorporated by reference in its entirety.

In one embodiment, emulsions of the liquid-crystal material in aqueous polymer solutions may be prepared using any of the standard dispersing devices such as homogenizers or emulsifiers that apply high shear to a mixture. Ultrasonic devices may also be used. The oil-water interface may be stabilized by addition of surfactants or particulate species such as colloidal silica. Surface stabilization by particulate species such as colloidal silica is particularly preferred as it can give a narrow size distribution and the size of the droplets can be controlled by the concentration of particulate species employed. The process employing particulate species for stabilization is sometimes referred to in the art as the limited coalescence process as disclosed by Whitesides and Ross (J. Colloid Interface Sci. 169, 48 (1995)).

By employing a mixture of two differently reflecting liquid-crystal materials in different populations of domains, in a monolayer, a broadband bi-stable display having improved angle dependency and improved neutral reflection in the bright state can be obtained.

In a preferred embodiment, reflected light from the display sheet when the imaging layer is in the first reflecting state has CIE tristimulus values X, Y and Z that are within 20 percent of each other. It is also preferred that when the liquid-crystal material is in the planar state, the total reflected light from the display sheet has CIE tristimulus values X, Y and Z that are 20 percent closer to each other than the CIE tristimulus values of the liquid-crystal-derived light with only one of the liquid crystal materials. The X, Y, and Z values can be approximated based on measurements made on a tristimulus calorimeter R, G, B measurements, as will be understood by the skilled artisan.

In one embodiment of the invention, shown in FIG. 1, a display 10 is prepared by applying a substantial monolayer of domains in a chiral-nematic layer 30 of PDLC domains or droplets onto a flexible support or display substrate 15 with a transparent conducting overcoat forming first conductors 20. A second conducting layer forming second conductors 40 is applied over the PDLC or imaging layer. A light-absorbing layer 35 containing black nanopigment or dispersed carbon black may be coated between the PDLC layer and the second conducting layer to improve contrast of the display. The display may further comprise a plurality of chiral nematic domains 36 and 37 that have been doped to preferentially reflect different portions of the visible and infrared (IR) parts of the spectrum. It is preferred that there are no more than two differently doped domains. It is also preferred that these differently doped domains preferentially reflect (i.e. have a peak reflectance or $\lambda_{max}$) in the green and red parts of the spectrum wherein the different parts of the spectrum are defined as follows: blue, below 480 nm; green, 480 to 560 nm; yellow, 560 to 590 nm; orange, 590 to 630 nm; red, 630 to 720 nm; and IR, above 720 nm. In a display of the present invention, it is preferred that the peak reflected wavelength of a first material in a first domain population is 450 to 560 nanometers and the peak reflected wavelength of a second material in a second domain population is 561 to 720 nanometers.

In a preferred embodiment, the imaging layer comprises a mixture of just two different liquid crystal materials, in two different populations of domains, in which the number of domains of each of the two populations of domains is 30 to 70 percent, preferably about 50 percent, of the total number of domains. Alternatively, the imaging layer comprises a mixture of just two different liquid crystal materials, in two different populations of domains, in which the volume of the liquid-crystal material forming each of the two populations of domains is 30 to 70 percent, preferably about 50 percent, of the total volume of domains in the display.

The liquid crystalline composition employed in the present invention is a chiral-nematic material. Preferably, the material comprises one or more liquid-crystal compounds forming a chiral-nematic material. Preferably, the liquid crystal mixture comprises 2 to 25 compounds, preferably 3 to 15 compounds. Particularly suitable liquid crystalline compositions are those in which the achiral liquid crystalline compounds comprise cyclic compounds, for example biphenyls, as will be appreciated by the skilled artisan. Suitable liquid crystalline compounds are well known to the skilled artisan.

Examples of nematic hosts are mixtures containing 5CB or MBBA.

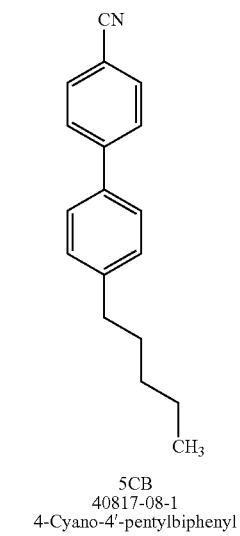

5CB
40817-08-1
4-Cyano-4'-pentylbiphenyl

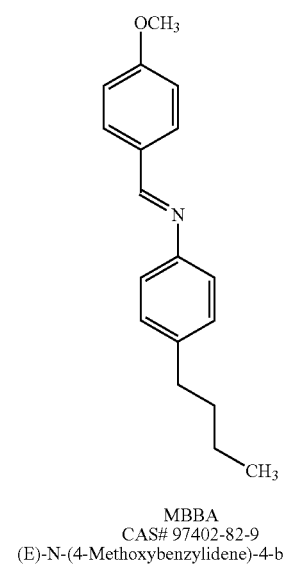

MBBA
CAS# 97402-82-9
(E)-N-(4-Methoxybenzylidene)-4-butylaniline

Examples of high twist chiral dopants that can be employed to provide the desired reflectance of the liquid-crystal materials include, for example, isosorbide esters (1) as disclosed in U.S. Pat. No. 6,217,792, taddols (2) as disclosed in U.S. Pat. No. 6,099,751 and spirobiindanes (3) as disclosed in U.S. patent application Ser. No. 10/651,692 by T. Welter et al., filed Aug. 29, 2003, titled "Chiral Compounds And Compositions Containing The Same," hereby incorporated by reference.

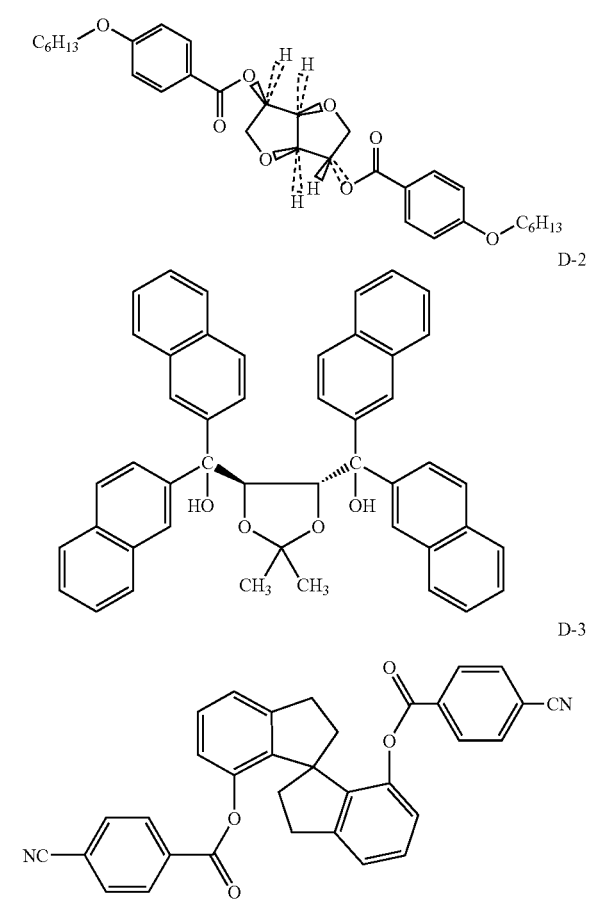

One or more chiral dopants can be used cumulatively in an effective amount. Suitably, a dopant can be used in the amount of 0.1 to 20 weight percent, based on the total weight of the liquid crystal composition, preferably 0.5 to 10 weight percent, more preferably 1 to 6 weight percent. As mentioned above, the amount of chiral dopant necessary to obtain the desired pitch is employed.

The liquid crystalline compositions can advantageously be used for coating substrates. Examples of suitable substrates are metal surfaces, plastic surfaces, glass or ceramic surfaces or films. To this end, the compositions are, for example, applied to a substrate, preferably a polymeric film, if desired by knife coating or other physical influences. One embodiment of a display in which domains of a cholesteric liquid crystal composition are dispersed in a polymeric matrix, disposed between electrodes is, for example, disclosed in U.S. Pat. No. 6,236,442 to Stephenson et al. and U.S. Pat. No. 5,695,682 issued Dec. 9, 1997 to Doane et al., the disclosures of which are incorporated by reference.

In one embodiment, a display comprises: (a) a flexible transparent support; (b) a patterned first conductor layer comprising transparent first conductors; (c) a patterned second conductor layer comprising second optionally transparent conductors; and (d) at least one imaging layer comprising domains of polymer-dispersed chiral nematic (cholesteric) liquid crystal material dispersed in a continuous polymeric matrix, the imaging layer disposed between the first and second conductors. Such chiral nematic liquid crystal material can exhibit two contrasting stable states, a reflecting planar state and a weakly scattering focal conic state, which two states can be switched from one to the other by application of suitable voltages.

The inventors have determined that the contrast of the display is degraded if there is more than a substantial monolayer of CLC domains. The term "substantial monolayer" is defined by the Applicants to mean that, in a direction perpendicular to the plane of the display, there is no more than a single layer of domains sandwiched between the electrodes at most points of the display (or the imaging layer), preferably at 75 percent or more of the points (or area) of the display, most preferably at 90 percent or more of the points (or area) of the display. In other words, at most, only a minor portion (preferably less than 10 percent) of the points (or area) of the display has more than a single domain (two or more domains) between the electrodes in a direction perpendicular to the plane of the display, compared to the amount of points (or area) of the display at which there is only a single domain between the electrodes.

The amount of material needed for a monolayer can be accurately determined by calculation based on individual domain size, assuming a fully closed packed arrangement of domains. (In practice, there may be imperfections in which gaps occur and some unevenness due to overlapping droplets or domains.) On this basis, the calculated amount is preferably less than about 150 percent of the amount needed for monolayer domain coverage, preferably not more than about 125 percent of the amount needed for a monolayer domain coverage, more preferably not more than 110 percent of the amount needed for a monolayer of domains. Furthermore, improved viewing angle and broadband features may be obtained by appropriate choice of differently doped domains based on the geometry of the coated droplet and the Bragg reflection condition.

In a preferred embodiment of the invention, the display device or display sheet has simply a single imaging layer of liquid crystal material along a line perpendicular to the face of the display, preferably a single layer coated on a flexible substrate. Such as structure, as compared to vertically stacked imaging layers each between opposing substrates, is especially advantageous for monochrome shelf labels and the like. Structures having stacked imaging layers, however, are optional for providing additional advantages in some case.

Preferably, the domains are flattened spheres and have on average a thickness substantially less than their length, preferably at least 50% less. More preferably, the domains on average have a thickness (depth) to length ratio of 1:2 to 1:6. The flattening of the domains can be achieved by proper formulation and sufficiently rapid drying of the coating. The domains preferably have an average diameter of 2 to 30 microns. The imaging layer preferably has a thickness of 10 to 150 microns when first coated and 2 to 20 microns when dried.

The flattened domains of liquid crystal material can be defined as having a major axis and a minor axis. In a preferred embodiment of a display or display sheet, the major axis is larger in size than the cell (or imaging layer) thickness for a majority of the domains. Such a dimensional relationship is shown in U.S. Pat. No. 6,061,107, hereby incorporated by reference in its entirety.

Returning to FIG. 1, a preferred embodiment will now be described. A sheet designated as display 10 includes a display substrate 15 that is a thin transparent polymeric material. One such material is Kodak Estar® film base formed of polyester plastic that has a thickness of between 20 and 200 micrometers. For example, the display substrate 15 can be a 125-micrometer thick sheet of polyester film base. Other polymers, such as transparent polycarbonate, can also be used.

One or more first conductors 20 are formed on display substrate 15 that can be tin-oxide, indium-tin-oxide (ITO), or polythiophene, with ITO being the preferred material. Typically the material of first conductors 20 is sputtered or coated as a layer over display substrate 15 and has a resistance of less than 1000 ohms per square. First conductors 20 can be formed in a conductive layer, for example, by conventional lithographic or laser etching means. Transparent first conductors 20 can also be formed by printing a transparent organic conductor such as PEDT/PSS, PEDOT/PSS polymer, which materials are sold as Baytron® P by Bayer AG Electronic Chemicals.

Chiral-nematic liquid-crystal layer 30 overlaying first conductors 20 can contain chiral-nematic liquid-crystal material such as those disclosed in U.S. Pat. No. 5,695,682 issued Dec. 9, 1997 to Doane et al., the disclosure of which is incorporated by reference. Such materials are made using highly anisotropic nematic liquid-crystal mixtures and adding a chiral doping agent to provide helical twist, in the planes of the liquid crystal, to the point that interference patterns are created that reflect incident light. Application of electrical fields of various intensity and duration can be employed to drive a chiral-nematic (cholesteric) liquid-crystal material into a reflective state, into a weakly scattering state, or into an intermediate state. These materials have the advantage of having first and second optical states that are both stable in the absence of an electrical field. The materials can maintain a given optical state indefinitely after the field is removed. Chiral-nematic liquid-crystal materials can be formed using a two-component system such as MDA-00-1444 (undoped nematic) and MDA-00-4042 (nematic with high chiral dopant concentrations) available from E.M. Industries of Hawthorne, N.Y.

In a preferred embodiment, as mentioned above, chiral-nematic liquid-crystal layer 30 is a chiral-nematic liquid-crystal material dispersed in gelatin, preferably deionized photographic-grade gelatin. For example, the liquid-crystal material is mixed at 8% chiral-nematic liquid crystal in a 5% gelatin aqueous solution. The mixture is dispersed to create an emulsion having 8-10 micrometer diameter domains of the liquid crystal in aqueous suspension. The domains can be formed using the limited coalescence technique described in copending U.S. patent application Ser. No. 09/478,683 filed Jan. 6, 2000 by Stephenson et al. The emulsion can be coated over first conductors 20 on a polyester display substrate 15 and dried to provide an approximately 9-micrometer thick polymer dispersed chiral-nematic coating. Other organic binders such as polyvinyl alcohol (PVA) or polyethylene oxide (PEO) can be used in place of the gelatin. Such emulsions are machine coatable using coating equipment of the type employed in the manufacture of photographic films. A gel sublayer can be applied over first conductors 20 prior to applying chiral-nematic layer 30 as disclosed in U.S. Pat. No. 6,423,368 by Stephenson et al.

A chiral-nematic liquid-crystal material can exhibit, respectively, a planar and focal-conic state. In one embodiment, after a high voltage field has been applied and quickly switched to zero potential, the liquid-crystal molecules align as planar liquid crystals which reflect portions of incident light as planar reflective light. The chiral dopant concentration defines the wavelength of peak reflection. The bandwidth around the peak reflection is proportional to the optical birefringence of the nematic liquid crystal. An application of a lower voltage field causes molecules of the chiral-nematic liquid-crystal material to break into tilted cells known as focal conic liquid crystals. The orientation of the focal-conic material is weakly scattering rather than reflective. Changes in the low-voltage time duration permits molecules to assume orientations between reflective planar state and the light scattering focal conic state.

In the fully evolved focal-conic state, the chiral-nematic liquid crystal is light scattering and incident light is forward scattered and can be absorbed by a light-absorbing layer to create the appearance of a black (or blackish-dark) image area. Progressive evolution from a planar to focal-conic state causes a viewer to perceive a bright planar reflective light that transitions to black as the chiral-nematic material changes from reflective planar state to a fully evolved light-scattering focal-conic state. When the field is removed, chiral-nematic liquid-crystal layer maintains a given optical state indefinitely. The states are more fully discussed in U.S. Pat. No. 5,437,811 issued Aug. 1, 1995 to Doane et al.

Figure 2:
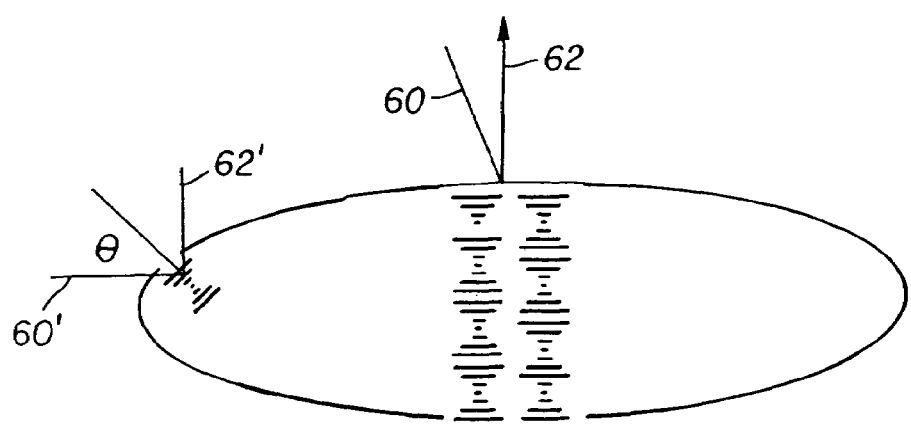
FIG. 2 is a sectional view of a domain containing chiral-nematic liquid material in the planar or reflecting state.

FIG. 2 is a sectional view of a domain containing chiral-nematic liquid-crystal material in the planar state. Chiral-nematic liquid-crystal material anchors against an arcuate surface. Incident light 60 and 60' can strike the domain, respectively, at a relatively perpendicular angle or at an oblique angle 60' resulting in reflected light 62 and 62', respectively. Light striking chiral-nematic material at an oblique angle reflects light at a shorter wavelength. The peak reflected wavelength and bandwidth of light is a function of both the chiral-nematic liquid-crystal material properties and domain size and shape.

Returning to FIG. 1, light-absorbing layer 35, overlaying the chiral-nematic liquid-crystal layer 30 is preferably composed of pigments that are milled below 1 micrometer to form "nano-pigments" in a binder. Such pigments are very effective in absorbing wavelengths of light in very thin (sub-micrometer) layers. Such pigments can be selected to be electrically inert to prevent degradation and interference with electrical display fields applied to display 10. Such pigments are disclosed in copending U.S. patent application Ser. No. 10/222,396 filed Aug. 16, 2002, hereby incorporated by reference. The filter layer can comprise two or more differently hued pigments. Light-absorbing layer 35 should be as thin as possible to minimize drive voltage while providing an acceptable degree of light absorption. Pigments are extremely efficient light absorbers and ideally suited for this purpose. In the preferred embodiment, chiral-nematic liquid-crystal layer 30 is between 4 and 10 micrometers thick. The state changing field for chiral-nematic liquid-crystal materials is typically 10 volts per micrometer coating thickness. Because light-absorbing layer 35, in the preferred embodiment, is disposed between the two field-carrying conductors, the layer should be significantly thinner than the chiral-nematic liquid-crystal layer 30. In practice, light-absorbing layer 35 should be less than about 1 micrometers, preferably 0.5 micrometers or less in thickness. The amount of binder in light-absorbing layer 35 should also be low to minimize any increase in drive voltage. A gelatin binder at a 1:1 ratio with the pigment can provide a layer with good bond strength to subsequently applied layers and minimize increases in drive voltage.

The light-absorbing layer 35 provides a high-contrast dark image area in the focal conic state relative to planar reflective light. The light-absorbing layer 35 can be coated simultaneously with the deposition of chiral-nematic liquid-crystal layer 30 or in a separate step. In a preferred embodiment, multi-layer coating equipment, such as those used in making photographic imaging elements, provides chiral-nematic liquid-crystal layer 30 and light-absorbing layer 35 as two co-deposited layers. Light-absorbing layer 35 is significantly thinner than chiral-nematic layer 30 and, therefore, as mentioned above, has minimal effect on the electrical field strength required to change the state of the chiral-nematic liquid-crystal material in the manufactured display.

Continuing to refer to the embodiment of FIG. 1, second conductors 40 overlay the light-absorbing layer 35. Second conductors 40 have sufficient conductivity to induce an electric field across chiral-nematic liquid-crystal layer 30, which field is strong enough to change the optical state of the polymeric-dispersed liquid-crystal material. Second conductors 40 in this embodiment are formed, for example, by vacuum deposition of conductive material such as aluminum, silver, chrome or nickel. In the case of vacuum coated second conductors 40, aluminum or silver provides very high conductivity. The layer of conductive material can be patterned using well known techniques of photolithography, laser etching or by application through a mask.

In another embodiment, second conductors 40 are formed by screen printing a reflective and conductive formulation such as UVAG® 0010 material from Allied Photochemical of Kimball, Mich. Such screen printable conductive materials comprise finely divided silver in an ultraviolet curable resin. After printing, when the material is exposed to ultraviolet radiation greater than 0.40 Joules/cm$^2$, the resin will polymerize in about two seconds to form a durable surface. Screen printing is preferred to minimize the cost of manufacturing the display. Providing a sufficient amount of polymer to pigment in light-absorbing layer 35 creates a printable surface on second conductors 40. Alternatively, second conductors 40 can be formed by screen printing thermally cured silver-bearing resins. An example of such a material is Acheson Electrodag® 461SS, a heat-cured silver ink. The first and second conductors can be patterned to produce an addressable matrix.

The following examples illustrate the invention.

EXAMPLE 1

This example illustrates the influence of laydown of the liquid-crystal ("LC") material on backscattering from the focal conic state and contrast of the display.

For 10 μm droplets, full monolayer coverage can be expected at a laydown of about 6.5 g/m$^2$ (600 mg/ft$^2$) of the liquid-crystal composition or a wet coverage of 80.7 cm$^3$/m$^2$ (7.5 cm$^3$/ft$^2$) if the coating composition is made up of 8% the liquid-crystal material and 5% gelatin by weight. An amount in slight excess of this will still constitute a substantial monolayer, well below a bi-layer of domains.

Figure 3:
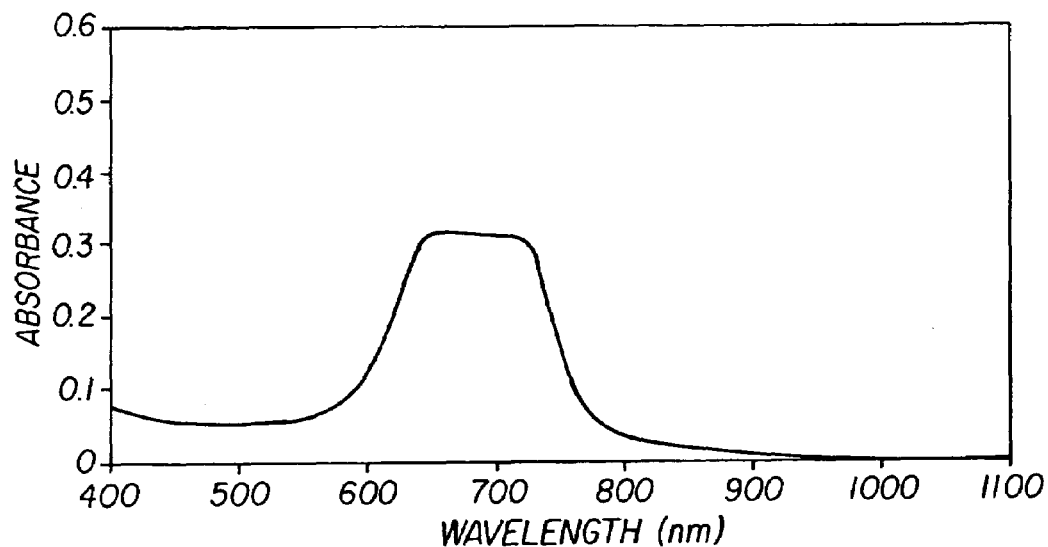
FIG. 3 is a plot of the "absorbance" versus wavelength for a red-reflecting chiral nematic composition as described in Example 1.

Chiral nematic compositions with center wavelengths of reflection at 470 and 690 nm were prepared by adding the appropriate amount of a high-twist chiral dopant to the nematic host mixture BL087 obtained from Merck, Darmstadt, Germany. The compositions were evaluated by placing a small amount on a glass slide with a cover slip. The "absorption" spectra were then obtained on a standard spectrophotometer. The spectrum of the 690 nm sample is shown in FIG. 3. It should be noted that there is no light absorption by these materials. At the reflecting wavelength, theoretically half the incident light is reflected and the other half is transmitted. Therefore, the spectrophotometer should measure an "absorbance" of 0.3 where "absorbance" is simply $\log_{10}(1/T)$; T being the transmittance of the sample. Since half the light is transmitted, T should theoretically be 0.5 and $\log_{10}(2) \sim 0.3$. FIG. 3 shows that the maximum "absorbance" of the sample is indeed close to 0.3.

Dispersions of the chiral nematic compositions were prepared as follows. To 200 grams of distilled water was added 3.3 grams of Ludox® colloidal silica suspension and 6.9 grams of a 10% w/w aqueous solution of a copolymer of methylaminoethanol and adipic acid. To this was added 90 grams of any one of the chiral-nematic compositions prepared above (i.e. reflection wavelength 470 nm or 690 nm). The mixture was stirred using a Silverson® mixer at 5000 rpm. It was then passed twice through a Microfluidizer® at 3000 psi. Two hundred and eighty grams of the resulting dispersion was mixed with 770 grams of an aqueous solution containing 6.8% w/w Type IV gelatin at 50° C. The dispersion (8% w/w LC material and 5% w/w gelatin) was stored in a refrigerator until further use. Microscopic examination showed that the dispersion consisted of uniform 10 μm droplets of the LC material in an aqueous gelatin medium.

Dispersions of the blue reflecting LC material (470 nm) and the red reflecting CLC material (690 nm) were combined to create a coating composition consisting of 30% by weight blue LC material and 70% by weight red LC material with an overall composition of 8% LC material and 5% gelatin. The coating composition was then knife coated onto a flexible polyethylene terephthalate (PET) surface with an 800 Å thick sputter coated indium tin oxide (ITO) layer to give different coverages of the LC material. The coatings were allowed to dry. A black nano-pigment layer was then spread over the LC layer followed by patches of conducting ink. Coatings containing wet coverages of 53.8, 129.2 and 161.5 cm$^3$/m$^2$ (5, 12 and 15 cm$^3$/ft$^2$) for the LC layer were obtained in this manner.

Figure 4:
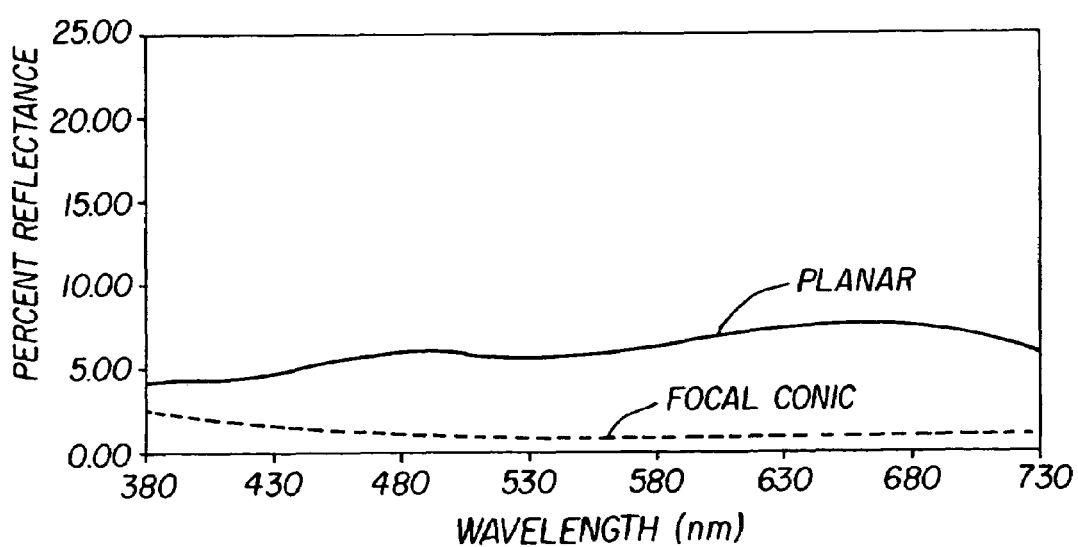
FIG. 4 is a plot showing the percent reflectance in the planar (solid line) and weakly scattering focal conic state (dotted line), respectively, for the polymer dispersed liquid crystal display of Example 1 in accordance with the present invention in which there are two different groups of liquid crystal domains containing, respectively, a blue-reflecting and a red-reflecting material.

Voltage pulses were applied to the coatings to switch them to the planar and focal conic states. The applied voltage had a frequency of 1 kHz. For the 53.8 cm$^3$/m$^2$ (5 cm$^3$/ft$^2$) sample, 80 volts was needed to switch to the planar texture and 40 volts to switch to the focal conic texture. The reflectivity in both states was recorded as a function of wavelength using a Spectrolino SpectoScan® reflectance spectrometer. The results are shown in FIG. 4. The full line and dashed line show percent reflectance in the planar reflective state and the weakly scattering focal conic state respectively.

Figure 5:
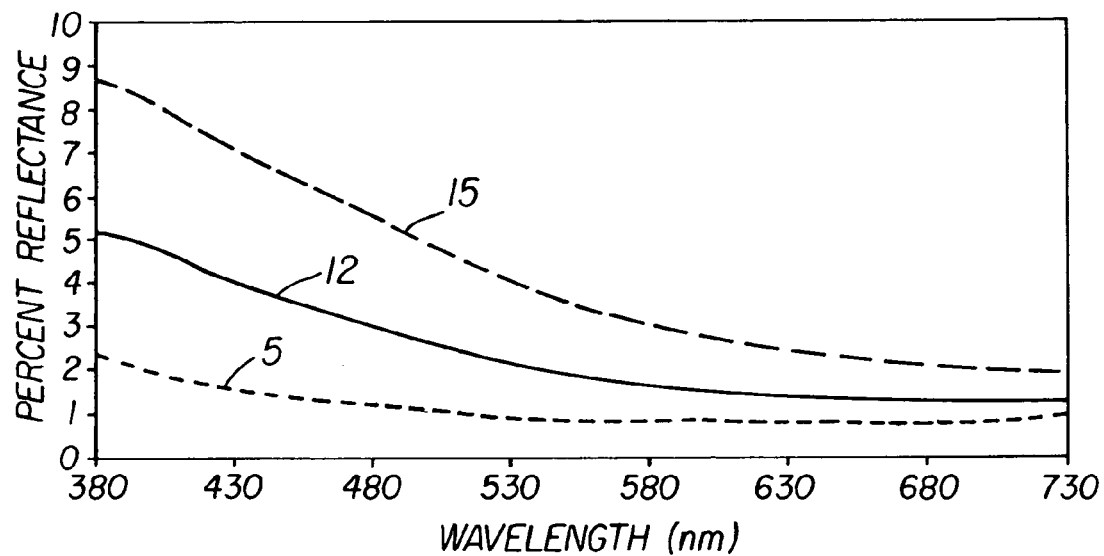
FIG. 5 is a plot showing the percent reflectance as a function of wavelength in the focal conic state for three different laydowns of the chiral-nematic liquid-crystal material, showing an increase in the backscattering with higher laydowns beyond the monolayer.

FIG. 5 shows percent reflectance as a function of wavelength for three different laydowns of the LC material. The full line, dashed line and dotted line correspond to coverages of 53.8, 129.2, and 161.5 cm$^3$/m$^2$ (5, 12 and 15 cm$^3$/ft$^2$) respectively. It is clear that the level of back scattering in the focal conic state increases significantly as the laydown is increased beyond monolayer coverage. Since the focal conic texture constitutes the dark state of the display, this has an adverse effect on the contrast ratio and the overall quality of the display. One may define the contrast ratio as the ratio of the reflectance in the bright (planar) state to the dark (focal conic) state at a wavelength of 570 nm. The contrast ratios corresponding to laydowns of 53.8, 129.2, and 161.5 cm$^3$/m$^2$ (5, 12 and 15 cm$^3$/ft$^2$) are 7.7, 6.4, and 3.5 respectively. It is clear that the contrast ratio is much lower at laydowns greater than a monolayer of the LC droplets because of a significant increase in backscattering in the focal conic state.

EXAMPLE 2

This example illustrates fabrication of a broadband bistable display with high contrast ratio. Consumers find such displays visually pleasing because of their more neutral appearance.

Figure 6:
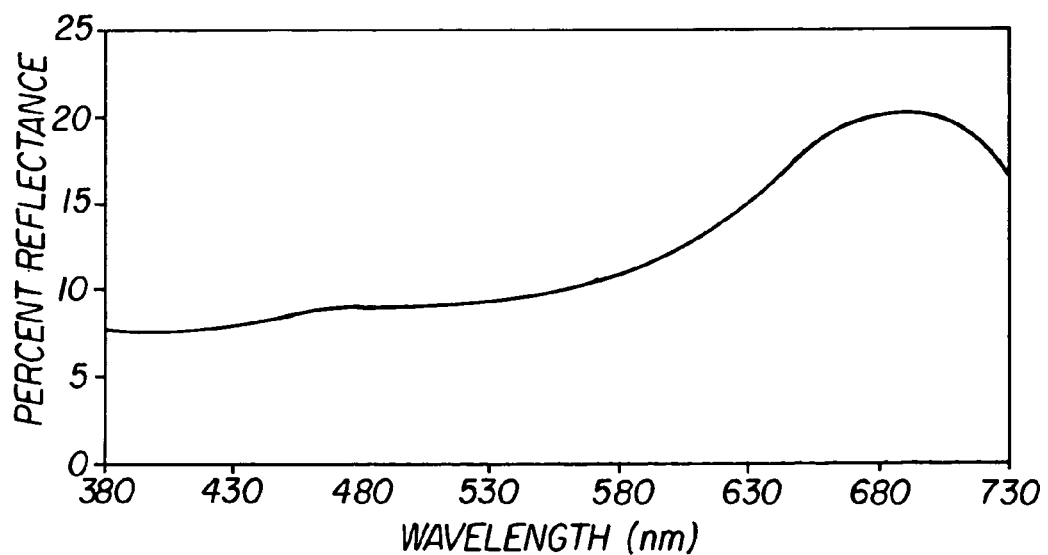
FIG. 6 shows the reflectance spectrum of the material of FIG. 3 when it is in the form of an elliptically shaped coated droplet.

It should be noted that the spectrum of the LC material in the planar state in a coated droplet is much broader than the spectrum of the material between glass slides. For example, the red reflecting LC material shown in FIG. 3 has a spectrum as shown in FIG. 6 when it is in a coated droplet because of the elliptical shape of the droplet. As shown previously in FIG. 2, measurable reflectance for a coated droplet may be obtained in this case at lower wavelengths because of the Bragg reflection condition at the curved boundary of a droplet. The wavelength of maximum reflection $\lambda_{max}$ is given by $\lambda_{max}$=np cos θ where n is the average refractive index of the LC material and p is its pitch. Note that cos θ decreases as θ increases. In other words, a red reflecting LC composition may actually reflect a bit of the blue, green, yellow, and orange portions of the spectrum when viewed on-axis. Visually pleasing broadband displays with high contrast and good viewing angle dependence may be obtained by combining red or infrared (IR) reflecting droplets with green or yellow reflecting droplets.

A green reflecting LC composition was prepared by adding the required amount of a high twist chiral dopant to the BL087 nematic host mixture. The concentration of dopant was adjusted to give a center wavelength of reflection of 550 nm. A dispersion of this LC material was prepared in the same manner as described previously in Example 1 for the blue and red materials.

Dispersions of the green reflecting LC material (550 nm) and the red reflecting LC material (690 nm) were combined to create a coating composition consisting of 50% by weight green LC material and 50% by weight red LC material with an overall composition of 8% LC material and 5% gelatin. The coating composition was then knife coated onto a flexible polyethylene terephthalate (PET) surface with an 800 Å thick sputter coated indium tin oxide (ITO) layer at a wet laydown of 86.1 cm³/m² (8 cm³/ft²) which is slightly above the calculated amount corresponding to exactly full monolayer coverage. The coatings were allowed to dry. A black nano-pigment layer was then spread over the LC layer followed by patches of conducting ink. A second coating was prepared using the chiral nematic mixture BL118 from Merck at 61.4 cm³/m² (5.7 cm³/ft²).

Figure 7:
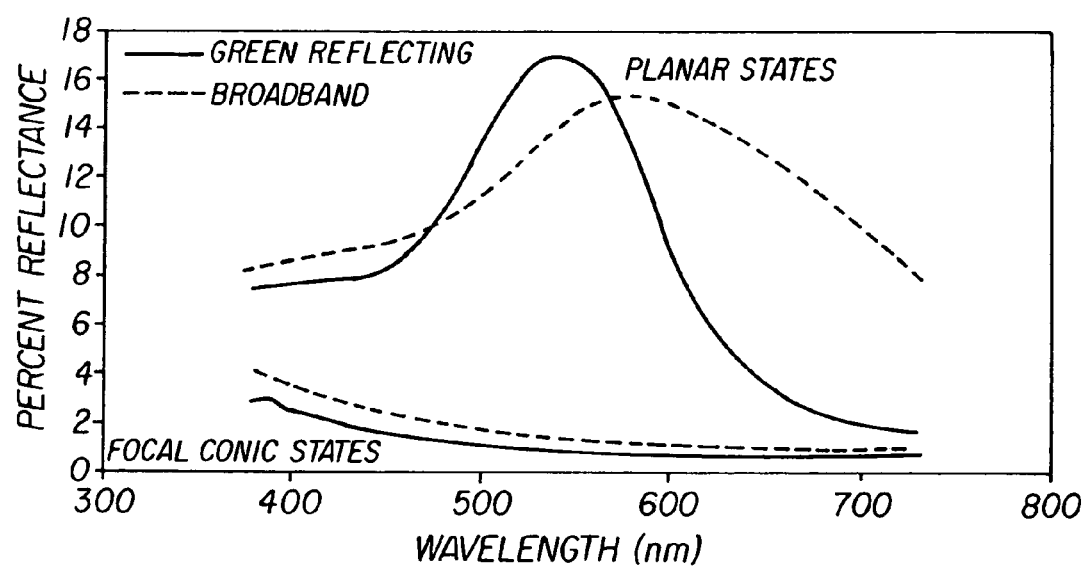
FIG. 7 is a plot of the percent reflectance in the planar reflective states and the weakly scattering focal conic states showing increased broadband with little increase in backscattering for a display according to the present invention (Example 2) having a combination of green and red domains, compared to a display having a single green-reflecting domain.

Voltage pulses were applied to the coatings to switch them to the planar and focal conic states. The applied voltage had a frequency of 1 kHz. For both samples, 120 volts was needed to switch to the planar texture and 60 volts to switch to the focal conic texture. The reflectivity in both states was recorded as a function of wavelength using a Spectrolino SpectoScan® reflectance spectrometer. The results are shown in FIG. 7. Inspection of FIG. 7 shows that the method of our invention allows broadband features to be obtained with little increase in backscattering in the focal conic state and therefore excellent contrast between the bright and dark states of the display. It should also be pointed out that a broadband display using a combination of green and red domains also provides superior contrast for off-axis viewing. A composition such as BL118 that reflects green, will shift to blue as the viewer moves off-axis in which case contrast with respect to a black dark state will be poor. However, the red component of our broadband display will shift to orange or yellow-green as the viewer moves off-axis thereby maintaining good contrast versus the dark state.

The invention can be practiced substituting materials and processes different from those used to generate the test sheet. The invention has been described in detail with particular reference to certain preferred embodiments thereof, but it will be understood that variations and modifications can be effected within the spirit and scope of the invention.

Parts List 10 display
15 display substrate
20 first conductors
30 chiral-nematic layer
35 light-absorbing layer
36 green-reflecting domains
37 red-reflecting domains
40 second conductors
60 incident light
60 ' oblique angle
62 reflected light
62 ' reflected light

What is claimed is:

1. A display sheet comprising:
a) an optional substrate for carrying layers of material;
b) an imaging layer comprising a substantial monolayer of isolated domains of liquid-crystal material dispersed in a continuous matrix, said liquid-crystal material having a first reflecting state within the visible light spectrum defining an operating spectrum and a second weakly scattering state in said operating spectrum, wherein said states are capable of being interchanged by an electric field, which states are capable of being maintained as a stable state in an absence of an electric field, wherein said domains of liquid-crystal material comprises a mixture, coated as an emulsion to form the imaging layer, of at least two populations, a first population comprising a first liquid-crystal material having a first $\lambda_{max}$ and a second population comprising a second liquid-crystal material having a second $\lambda_{max}$ wherein there is a difference between said first and said second $\lambda_{max}$ of at least 50 nm, wherein a substantial monolayer of isolated domains of liquid-crystal material means that, at most, only a minor portion of the area of the display sheet has more than a single domain between the electrodes in a direction perpendicular to the plane of the display sheet, compared to the amount of area of the display sheet at which there is only a single domain between the electrodes, whereby a more color-neutral image area is provided when the image area is in the first reflecting state;
c) first transparent conductors disposed on one side of said imaging layer;
d) second conductors disposed on an opposite side of said imaging layer.

2. The display sheet of claim 1 wherein reflected light from said display sheet when said imaging layer is in the first reflecting state has CIE tristimulus values X, Y and Z that are within 20 percent of each other.

3. The display sheet of claim 1 wherein the first liquid-crystal material has a peak reflected wavelength in the range of 561 to 720 nanometers and said second liquid-crystal material has a peak reflected wavelength in the range of 450 to 560 nanometers.

4. The display sheet of claim 1 wherein said first and said second liquid-crystal material each comprises a dopant having a first and a second concentration, respectively, wherein said first and said second concentration differs such that the pitch of said second liquid-crystal material is smaller than the pitch of said first liquid-crystal material.

5. The display sheet of claim 1 wherein said first liquid-crystal material reflects red having $\lambda_{max}$ in a range 630 to 720 nm.

6. The display sheet of claim 5 wherein the imaging layer comprises a mixture of only two types of domains each reflecting in a different part of the visible spectrum, wherein said first liquid-crystal material reflects red and said second liquid-crystal material reflects green, blue, or cyan.

7. The display sheet of claim 6 wherein said first liquid-crystal material is red and said second liquid-crystal material is green.

8. The display sheet of claim 1 wherein said first and said second conductors are patterned to produce an addressable matrix.

9. The display sheet of claim 1 wherein said domains comprise chiral-nematic liquid-crystal material and said continuous matrix comprises gelatin.

10. The display sheet of claim 1 wherein there is no more than a single layer of domains sandwiched between the electrodes at most points of the imaging layer.

11. The display sheet of claim 1 wherein there is no more than a single layer of domains sandwiched between the electrodes at 75 percent or more of the area of the display sheet.

12. The display sheet of claim 1 wherein said domains of liquid-crystal material comprises a mixture of substantially just two populations, a first population comprising a first liquid-crystal material having a first $\lambda_{max}$ and a second liquid-crystal material having a second $\lambda_{max}$ wherein there is a difference between said first and said second $\lambda_{max}$ of at least 50 nm.

13. The display sheet of claim 12 wherein there a difference between said first and said second $\lambda_{max}$ of at least 100 to 250 nm.

14. The display sheet of claim 12 wherein the first liquid-crystal material has a peak reflected wavelength in the range of 561 to 720 nanometers and said second liquid-crystal material has a peak reflected wavelength in the range of 450 to 560 nanometers.

15. The display sheet of claim 12 wherein said first liquid-crystal material reflects red having $\lambda_{max}$ in a range 630 to 720 nm.

16. The display sheet of claim 15 wherein said first liquid-crystal material reflects red and said second liquid-crystal material reflects green, blue, or cyan.

17. The display of claim 16 wherein said first liquid-crystal material is red and said second liquid-crystal material is green.

18. The display of claim 12 in which the number of domains of each of the two populations of domains is about 50 percent of the total number of domains.

* * * * *